(12) United States Patent
Bossoni

(10) Patent No.: US 10,661,387 B2
(45) Date of Patent: May 26, 2020

(54) BRIDGE FOR LASER CUTTING MACHINES

(71) Applicant: Bystronic Laser AG, Niederönz (CH)

(72) Inventor: Sergio Bossoni, Zurich (CH)

(73) Assignee: BYSTRONIC LASER AG, Niederoenz (CH)

( * ) Notice: Subject to any disclaimer, the term of this patent is extended or adjusted under 35 U.S.C. 154(b) by 409 days.

(21) Appl. No.: 15/525,342

(22) PCT Filed: Oct. 14, 2015

(86) PCT No.: PCT/IB2015/057862
§ 371 (c)(1),
(2) Date: Aug. 31, 2017

(87) PCT Pub. No.: WO2016/083916
PCT Pub. Date: Jun. 2, 2016

(65) Prior Publication Data
US 2017/0361402 A1  Dec. 21, 2017

(30) Foreign Application Priority Data
Nov. 24, 2014  (EP) ..................... 14194596

(51) Int. Cl.
*B23K 26/16*  (2006.01)
*B23K 26/02*  (2014.01)
(Continued)

(52) U.S. Cl.
CPC .......... *B23K 26/0876* (2013.01); *B23K 26/38* (2013.01); *B23K 37/0235* (2013.01);
(Continued)

(58) Field of Classification Search
CPC .. B23K 26/08; B23K 26/082; B23K 26/0853; B23K 26/0861; B23K 26/0869;
(Continued)

(56) References Cited

U.S. PATENT DOCUMENTS 4,392,604 A * 7/1983 Sears ..................... B23K 37/04
228/212
4,700,045 A * 10/1987 Merry ................. B23Q 35/128
219/121.78
(Continued)

FOREIGN PATENT DOCUMENTS

| CN | 102198593 A | 9/2011 |
| WO | 2008056244 A2 | 5/2008 |
| WO | 2013160392 A1 | 10/2013 |

OTHER PUBLICATIONS

Database WOI Week 201174 Thomson Scientific, London, GB; AN 2011-N72471-& CN 102 198 593 (A Wuxi Hualian Precision Machinery Co Ltd) Sep. 28, 2011 (Sep. 28, 2011).

*Primary Examiner* — Sang Y Paik
(74) *Attorney, Agent, or Firm* — Workman Nydegger

(57) ABSTRACT

The invention relates to a bridge (B) for laser cutting machines. In the latter, a laser cutting head (K) is guided over a workpiece support (W) by means of a guide system. The bridge (B) is configured in the form of a substantially straight and box-like profile (1) which has at least one guide for a cutting carriage carrying the laser cutting head (K). According to the invention, at least two side faces (10, 11) of the profile (1) that are located opposite one another with regard to the vertical plane of symmetry (VSE) of the bridge enclose a non-zero angle (a) of less than 180° that opens in the direction of the machining region, at least over a part of the height of said profile (1).

12 Claims, 2 Drawing Sheets

(51) Int. Cl.
  *B23K 26/08* (2014.01)
  *B23K 37/02* (2006.01)
  *B23K 26/38* (2014.01)
  *E04C 3/04* (2006.01)
  *B23Q 1/01* (2006.01)

(52) U.S. Cl.
  CPC ............ *B23K 37/0288* (2013.01); *B23Q 1/01* (2013.01); *E04C 3/04* (2013.01); *B23Q 1/015* (2013.01); *B23Q 1/017* (2013.01)

(58) Field of Classification Search
  CPC ............ B23K 26/0876; B23K 26/0884; B23K 26/36; B23K 26/362; B23K 26/364; B23K 26/38; B23K 37/02; B23K 37/0211–37/0235; B23K 37/0241; B23K 37/0282; B23K 37/0288; B23Q 1/01
  USPC .......................................... 219/121.6–121.82
  See application file for complete search history.

(56) References Cited

U.S. PATENT DOCUMENTS

| | | | | |
|---|---|---|---|---|
| 4,808,791 A | * | 2/1989 | Puozzo .................. | B25J 9/023 |
| | | | | 148/903 |
| 5,124,524 A | * | 6/1992 | Schuster ............. | G01B 11/005 |
| | | | | 219/121.78 |
| 2013/0092666 A1 | * | 4/2013 | Oh ....................... | B23K 1/0056 |
| | | | | 219/121.64 |

* cited by examiner

BRIDGE FOR LASER CUTTING MACHINES

CROSS REFERENCE TO RELATED APPLICATIONS

The present application is a National stage application from PCT application PCT/IB2015/057862 filed on Oct. 14, 2015, which claims priority to European application EP14194596.4 filed on Nov. 24, 2014, all of which incorporated herein by reference entirely.

FIELD OF INVENTION

The invention relates to a bridge for laser cutting machines, in the case of which a laser cutting head can be guided across a workpiece support along two preferably orthogonal axes by means of a guide system, wherein the bridge is configured in the form of a substantially straight and box-shaped profile, which has at least one guide for a cutting carriage carrying the laser cutting head, wherein, viewed from a direction vertically onto the workpiece support, the center of gravity of the laser cutting head is always located next to the vertical plane of symmetry of the bridge, according to the preamble of claim 1, as well as to a laser cutting machine, in the case of which such a laser cutting head can be guided across a workpiece support along two preferably orthogonal axes by means of a guide system, wherein the laser cutting head is guided on a bridge configured in the form of a substantially straight, box-shaped profile, so as to be displaceable along this bridge, wherein the profile has at least one guide for a cutting carriage carrying the laser cutting head, and wherein, viewed from a direction vertically onto the workpiece support, the center of gravity of the laser cutting head is always located next to the vertical plane of symmetry of the bridge, according to the preamble of claim 9.

BACKGROUND OF THE INVENTION

In the case of laser cutting machines for metal machining, in particular for cutting workpieces of flat material, the laser cutting head can be displaced along a cutting bridge, which bridge, in turn, can be displaced in guides along a cutting table, which accommodates the flat material. The laser cutting head can be placed above every point of the machining region of the flat material in two, preferably orthogonal directions, by means of this guide system. The laser cutting head can further preferably also be raised or lowered, respectively, vertically to the surface of the cutting table and thus also of the flat material.

The bridge, which supports the laser cutting head in a displaceable manner, is typically made of a box-shaped profile, which has an approximately rectangular cross section, which is guided far below its center of gravity, whereby a cable drag comprising supply, control and sensor lines, is also guided along the bridge to the laser cutting head. Examples for such substantially rectangular profiles for the bridges of laser portal machines can be found in DE202005014428, in WO201360392 or in WO2015086724.

Such bridges of rectangular box profiles of sheet steel have the disadvantage of the parallelogram effect, of an often relatively low stiffness-to-weight ratio, and of the unfavorable center of gravity position of the cutting carriage comprising the cutting head outside of the force transmission locations to the support structure. In the case of these designs, a bellows, which is provided if need be, is furthermore located directly in the region of the laser reflections and splashes of hot, molten materials, which start at the machining zone and which can badly damage the bellows, on the side of the cutting head.

SUMMARY

It was thus the object of the invention at hand to specify a bridge, which reduces these disadvantages or which does not have them at all, respectively. A further object was a laser cutting machine, in the case of which such a bridge and the advantageous properties thereof can be used to further optimize the demands of small weight and good mechanical properties, which are opposite per se.

These objects are solved by means of the features of independent claims 1 and 9. Further features of the invention follow from the dependent claims as well as from the illustrations.

To solve the first object, provision is made according to the invention at hand that at least two side faces of the profile, which are located opposite one another with regard to the vertical plane of symmetry, enclose a non-zero angle of less than 180°, preferably less than 90° with one another, which opens in the direction of the machining region, at least across a part of the height of the profile. This creates a bridge comprising a trapezoidal or triangular shape, which widens towards the machining region, whereby the shear effect (parallelogram effect) of a common rectangular pipe is avoided and the forces from the bridge can be transmitted optimally into the support structures. The flux of force from the laser cutting head or the cutting carriage carrying it, respectively, can thus further also be guided ideally into the support structure. Dust or material splashes, respectively, appearing in particular on the side of the laser cutting head in response to the cutting process, can furthermore not easily damage a bellows, which is provided if need be.

Provision is thereby preferably made according to the invention for at least the side faces of the profile facing the cutting carriage or the machining head, respectively, to enclose an angle of between 10° and 60°, preferably between 20° and 45°, with the vertical plane of symmetry, at least across a part of its height. In spite of light construction, a high bending stiffness can be achieved (in the longitudinal direction of the bridge as well as vertically thereto) by means of this incline on the side of the bridge, which is force-wise by the weight of the cutting carriage and of the projecting laser cutting head as well as a high torsional stiffness. A bellows, if need be, is located outside of the path of laser reflections and of material splashes from the machining zone and is thus largely protected against damages caused by laser reflections and by splashes with hot material. In the case of a corresponding ratio of incline of the side faces and of the height of the bridge, the center of gravity of the arrangement of cutting carriage and laser cutting head can also be shifted inside the vertical projection of the force transmission locations from the bridge to the support structure.

An alternative embodiment according to the invention is characterized in that one of the side faces, which are located opposite one another with regard to the vertical plane of symmetry, is located parallel to the vertical plane of symmetry.

An embodiment is particularly preferred, in the case of which a second side face, which is located so as to face away from the cutting carriage or from the machining head, respectively, with regard to the vertical plane of symmetry, as further feature of the invention encloses an angle of between 10° and 60°, preferably of between 20° and 45°, with the vertical plane of symmetry, at least across a part of its height. The upper side of the bridge is thereby preferably designed as triangular edge and the bridge in its entirety is configured substantially as triangular box profile. Laser reflections and material splashes can furthermore reach and damage the bellows only to a small extent or not at all. Dust thus also does not settle easily thereon. In the case of completely triangular configuration of the upper side of the bridge, material splashes and dust cannot settle on the upper side of the bridge, but can slip along the inclined surfaces.

To enable an optimized attachment of the cable drag, provision is made according to an optional feature of the invention for provision to be made on the second side face in the section located closer to the machining region for a projection comprising an upper side, which runs substantially vertically on the inclined section. The preferably lower run of the cable drag can settle thereon so as to be protected against material splashes appearing in response to the cutting.

For the moment-optimized and vibration-optimized attachment of the laser cutter head to the bridge by interconnecting a cutting carriage, a further embodiment according to the invention provides for provision to be made for at least two guides, which are spaced apart across the height of a side face, preferably a side face, which is inclined with regard to the vertical plane of symmetry, for a cutting carriage carrying the laser cutting head and define an outer boundary surface on the side of the laser cutting head, wherein this outer boundary surface encloses an angle of between 10° and 60°, preferably an angle of between 20 and 45°, with the vertical plane of symmetry.

To nonetheless be able to move the bridge in the desired close distance with sufficient clearance between bridge and flat material, a further preferred embodiment of the invention provides for a side face of the profile, which faces the workpiece support, to run across more than 30%, preferably across more than half of the width of the profile or of the support distance, respectively, between the two force transmission locations, substantially flat and parallel to the workpiece support.

For a weight-optimized construction, provision is made for the optional feature of the invention that the profile is made of beveled metal sheets, which are connected to one another, preferably in the form of a hollow profile, comprising at least one inner crossbar. In spite of the best mechanical as well as vibration-related properties, a bridge, which is constructed in this manner, is configured in a mass-optimized manner in contrast to previous bridges. Less material is used and light steel constructions can be used. This bridge further provides for a simple assembly, because it does not need to be connected, but can be produced, handled and installed in one piece.

To solve the posed object, a laser machine described above is characterized according to the invention in that it is constructed using a bridge according to one of the preceding claims.

Provision is thereby preferably made as further feature of the invention for the bridge to be supported at least on the side, which faces the workpiece support, preferably on the two ends, which are located opposite one another in the longitudinal direction, and preferably be supported orthogonally to the longitudinal extension of the bridge so as to be capable of being displaced with regard to the workpiece support.

A preferred feature of the invention is further that the support of the bridge and/or the guide thereof for the displacement with regard to the workpiece support is arranged below the center of gravity of the bridge.

A particularly advantageous embodiment of the invention further provides for at least each force transmission location from the bridge to the support structure thereof to be located in a range of +/−100 mm from the intersection of the extension of a boundary surface with the upper edge of the support structure. This results in an optimal introduction of the forces from the bridge into the support structure.

The solution of the object for a machine, in the case of which the cutting carriage and/or the laser cutting head is connected to a power supply, laser source or the like and/or an evaluation unit, a control unit or the like by means a cable drag, and wherein the bridge is embodied at least according to one of the above paragraphs, and the lower run of a section of the cable drag, which runs in the longitudinal direction of the bridge, is supported on the upper side of the projection of the bridge.

Further advantages, features and details of the invention follow from the description below, in which exemplary embodiments of the invention are described with reference to the drawings. The features mentioned in the claims and in the description can thereby in each case be significant for the invention, either alone or in any combination.

The list of reference numerals is part of the disclosure. The figures are described in connection and comprehensively. The same reference numerals signify the same components, reference numerals with different indices specify components having the same function or similar components.

DETAILED DESCRIPTION OF THE PREFERRED EMBODIMENTS

Figure 1:
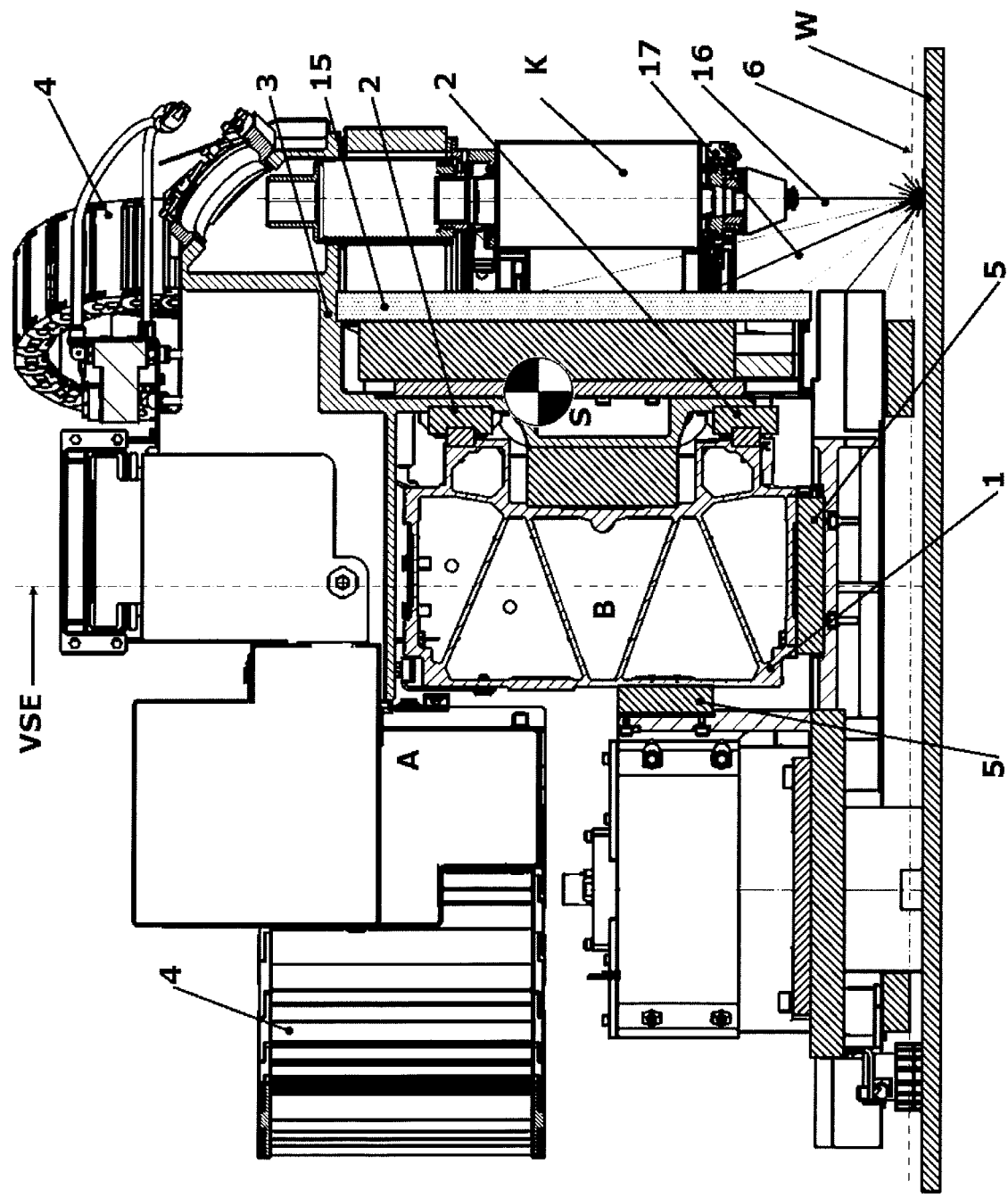
FIG. 1 shows a cross section through a common cutting bridge according to the prior art, comprising a rectangular profile cross section.

The cutting bridge B according to the prior art, which is illustrated in an exemplary manner in FIG. 1, consists of a profile 1 of a substantially rectangular cross section, comprising guide rails 2 for a cutting carriage 3. This cutting carriage can be moved along the longitudinal extension (in FIG. 1 vertically to the paper plane) on the guide rails 2 and carries the laser cutting head K. The guide rails 2 define an outer boundary surface FB of the bridge B, which is part of the guide system for the laser cutting head K, in order to guide the latter across a workpiece support W, along two preferably orthogonal axes (see FIG. 2).

The bridge B, mostly configured in the form of a straight, box-shaped profile, typically also carries further components, for example a cable drag 4, comprising supply, control and sensor lines to the laser cutting head K. For the most part, the profile 1 of the bridge B is guided or supported, respectively, below the center of gravity in corresponding structures 5. The center of gravity of the laser cutting head K is always located next to the vertical plane of symmetry VSE of the bridge B, viewed from a direction vertically to the workpiece support.

The bridge B itself and all elements connected thereto, in particular laser cutting head K, the cable drag 4, etc., in turn, can be displaced with the workpiece support W in guides 6 along a cutting table, which accommodates the flat material. For this purpose, the end pieces 7 of the bridge B are provided with support wheels 8, which are supported on the guides 6 and which define force transmission points from the bridge B into the support structure thereof on the machine frame. The guides 6 thereby preferably run orthogonally to the longitudinal extension of the bridge B.

As can be seen in the schematic illustration of FIG. 2 of a preferred embodiment of a bridge B according to the invention, two side faces 10, 11 of the profile 1, which are located opposite one another with regard to the vertical plane of symmetry VSE, enclose a none-zero angle α of less than 180°, preferably less than 90° with one another, which opens in the direction of the machining region (below the profile 1) with the flat material FL to be machined. This creates a bridge comprising a triangular shape, which widens towards the machining region. If need be, this embodiment of the sides 10, 11 can also be provided across only a part of the height of the profile 1. A trapezoidal form of the profile 2 would be possible as well, in that the side faces 10, 11 do not intersect, but are connected to one another by an upper cover surface.

The preferred angular range for the side face 10, to which the cutting carriage 3 and the laser cutting head K are attached, with the vertical plane of symmetry VSE of the profile, lies at an angle β of between 10° and 60°, preferably of between 20° and 45°. The opposite side 11, on which the cable drag 4 is typically located, can be tilted similarly at an angle γ, so that the bridge B in its entirety is embodied substantially as triangular box profile. The side 11, however, could also be located parallel to the vertical plane of symmetry VSE. So as to reach an even better mechanical stability in spite of weight-optimized construction and outer design of the profile 1, which is already very stable, the profile 1, which is advantageously configured from beveled metal sheets, which are connected to one another, preferably in the form of a hollow profile, comprising at least one inner crossbar 14.

On the side of the bridge B located opposite the laser cutting head K, the side face 11 is provided with a projection 12 for the optimized attachment of the cable drag 4. The upper side of this projection 12 runs substantially vertically to the side face 11 or the inclined section thereof, respectively, and preferably accommodates the lower run of the cable drag 4.

For the moment-optimized and vibration-optimized attachment of the laser cutting head K to the bridge B, the relative position of the guides 2 for the cutting carriage 3 or the laser cutting head K, respectively, is of particular significance in any event. This is so, because at least two guides 2 for the cutting carriage 3, which are spaced part across the height of a side face, preferably of a side face 10, which is inclined with regard to the vertical plane of symmetry VSE, define an outer boundary surface FB on the side of the laser cutting head K. According to the invention, this outer boundary surface FB must enclose an angle β of between 10 and 60°, preferably an angle of between 20 and 45°, with the vertical plane of symmetry VSE.

The side face of the profile 1 of the bridge B, which faces the workpiece support W, preferably runs across more than 30%, preferably across more than half of the width of the profile 1, substantially flat and parallel to the workpiece support W. In certain applications, the above-mentioned conditions need to be expanded such that the support distance a, i.e. the distance between the two force transmission locations from the bridge B to the support structure, takes the place of the width of the profile 1. This distance is defined by the contact locations of the rollers 8 on the profile end pieces 7 with the guides 6.

The support of the bridge B and/or the guide thereof for the displacement with regard to the workpiece support W, preferably takes place below the center of gravity of the ridge B. For this purpose, the guides 6 and the rollers 8 of the bridge B are also arranged below the center of gravity of the bridge B.

In the same way as the contact points of the rollers 8 with the guides 6 define actual force transmission locations, virtual force transmission locations can be defined at the intersections of the outer boundary surfaces FB (also on both sides of the profile 1) with the support structure, preferably also the guides 6. On the side of the bridge B located opposite the laser cutting head K, this boundary surface FB equals the inclined side face 11. The distance d of the actual force transmission locations preferably lies in a range of +/−100 mm from the virtual force transmission locations, i.e. from the intersection of the extension of a boundary surface FB, 11 with the upper edge of the support structure.

Figure 2:
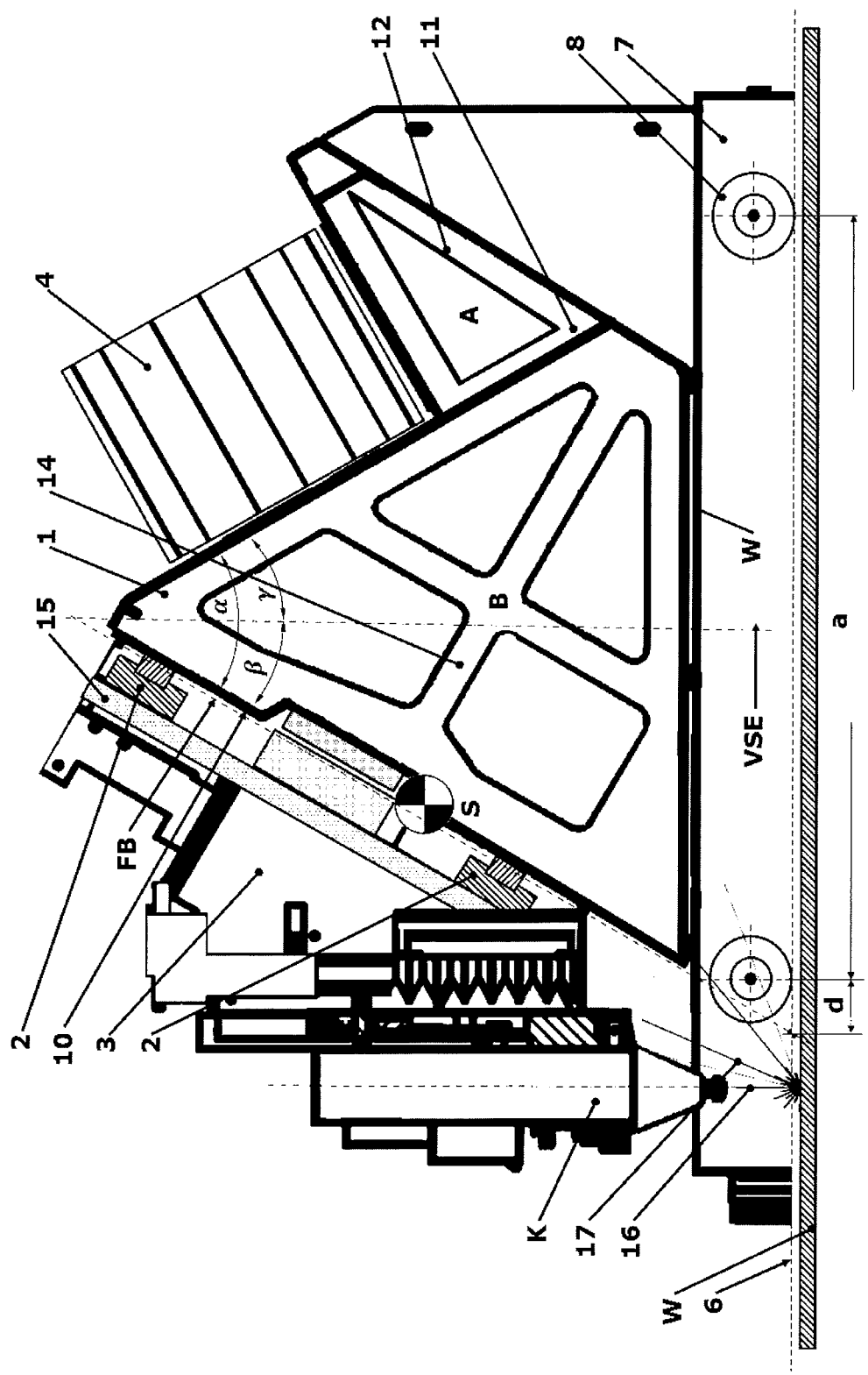
FIG. 2 shows a schematic illustration of a preferred embodiment of a bridge according to the invention, with the cross section vertically to the longitudinal extension thereof.

As can be seen by comparing FIGS. 1 and 2, a bellows, which covers the guides, drives, etc., is also protected against material splashes from the machining zone of the cutting head K by means of the inclined side of the bridge B on the side, on which the cutting carriage 3 and the cutting head K are arranged. In the case of a common design, as illustrated in FIG. 1, laser reflections and splashes can hit the bellows and can lead to holes therein, which further leads to contaminations below the bellows. This can lead to damages to the linear guides, to the drives and to the measuring systems. Such material splashes mainly occur in the case of piercing processes, whereby the bridge B and the cutting head K stand still. This is largely avoided according to the invention at hand with its inclined side face 10 on the side of the cutting head K.

REFERENCE LIST profile 1
guides, cutting carriage 2
cutting carriage 3
cable drag 4
support structure 5
guides bridge 6
end pieces bridge 7
support wheels bridge 8
side faces to cutting head 10
side face rear 11
projection 12
underside bridge 13
crossbars 14
bellows 15
laser outlet 16
laser reflection 17
support bellows A
bridge B
boundary surface FB
cutting head K
vertical plane of symmetry VSE
workpiece support W
support distance a
distance d

What is claimed is:

1. A bridge (B) for laser cutting machines, in the case of which a laser cutting head (K) can be guided across a workpiece support (W) along two preferably orthogonal axes by means of a guide system, the bridge (B) comprising:

a substantially straight and box-shaped profile, which has at least one guide for a cutting carriage carrying the laser cutting head (K), wherein, viewed from a direction vertically onto the workpiece support (W), the center of gravity (S) of the laser cutting head (K) is always located next to the vertical plane of symmetry (VSE) of the bridge (B), wherein a first side face (10) and a second side face (11) of the profile (1), which are located opposite one another with regard to the vertical plane of symmetry (VSE), enclose a non-zero angle (a) of less than 180° which opens in the direction of the machining region, at least across a part of the height of the profile (1), the second side face (11), which is located so as to face away from the cutting carriage (3) or from the laser cutting head (K), respectively, with regard to the vertical plane of symmetry (VSE) encloses an angle ($\gamma$) of between 10° and 60° with the vertical plane of symmetry (VSE), at least across a part of its height, and that provision is made on the second side face (11) in the section located closer to the machining region for a projection (12) comprising an upper side, which runs substantially vertically on the inclined section.

2. The bridge according to claim 1, wherein at least the first side faces (10) of the profile (1) facing the cutting carriage (3) or the laser cutting head (K), respectively, enclose an angle (13) of between 10° and 60° with the vertical plane of symmetry (VSE), at least across a part of its height.

3. The bridge according to claim 2, wherein the bridge comprises at least two guides (2), which are spaced apart across the height of one of the first side face (10) or the second side face (11) which is inclined with regard to the vertical plane of symmetry (VSE), for a cutting carriage (3) carrying the laser cutting head (K) and define an outer boundary surface (FB) on the side of the laser cutting head (K), wherein this outer boundary surface (FB) encloses an angle (13) of between 10° and 60°, preferably an angle of between 20 and 45°, with the vertical plane of symmetry (VSE).

4. The bridge according to claim 1, further comprising at least two guides (2), which are spaced apart across the height of the first side face (10) and the second side face (11) face, which is inclined with regard to the vertical plane of symmetry (VSE), for a cutting carriage (3) carrying the laser cutting head (K) and define an outer boundary surface (FB) on the side of the laser cutting head (K), wherein this outer boundary surface (FB) encloses an angle (13) of between 10° and 60° with the vertical plane of symmetry (VSE).

5. The bridge according to claim 1, wherein a side face (13) of the profile (1), which faces the workpiece support (W), runs across more than 30% of the width of the profile (1) or of the support distance (a), respectively, between the two force transmission locations, that are substantially flat and parallel to the workpiece support (W).

6. The bridge according to claim 1, wherein the profile (1) is made of beveled metal sheets, which are connected to one another by at least one inner crossbar (14).

7. A laser cutting machine comprising:
a laser cutting head (K) which can be guided across a workpiece support (W) along two preferably orthogonal axes by means of a guide system, the laser cutting head (K) being guided on and displaceable along a bridge (B) that is configured in the form of a substantially straight, box-shaped profile (1),
wherein the profile (1) has at least one guide (2) for a cutting carriage (3) carrying the laser cutting head (K), and wherein, viewed from a direction vertically onto the workpiece support (W), the center of gravity (S) of the laser cutting head (K) is always located next to the vertical plane of symmetry (VSE) of the bridge (B),
wherein the bridge (B) is embodied according to claim 1.

8. The machine according to claim 7, wherein the bridge (B) is supported at least on the side, which faces the workpiece support (W), preferably on the two ends (7), which are located opposite one another in the longitudinal direction, and is preferably supported orthogonally to the longitudinal extension of the bridge (B) so as to be capable of being displaced with regard to the workpiece support (W).

9. The machine according to claim 8, wherein the support of the bridge (B) and/or the guide thereof for the displacement with regard to the workpiece support (W) is arranged below the center of gravity of the bridge.

10. The machine according to claim 7, wherein the support of the bridge (B) and/or the guide thereof for the displacement with regard to the workpiece support (W) is arranged below the center of gravity of the bridge.

11. The machine according to claim 7, wherein at least each force transmission location from the bridge (B) to the support structure thereof is located in a range of +/−100 mm from the intersection of the extension of a boundary surface (FB, 11) with the upper edge of the support structure (6).

12. The machine according to claim 7, wherein the cutting carriage (3) and/or the laser cutting head (K) is connected to a power supply, laser source or the like and/or an evaluation unit, a control unit or the like by means a cable drag (4), wherein the bridge (B) is embodied at least according to one of claims 5 to 8, and the lower run of a section of the cable drag (4), which runs in the longitudinal direction of the bridge (B), is supported on the upper side of the projection (12) of the bridge (B).

* * * * *